April 27, 1937. A. WILLIAMS ET AL 2,078,785
FEED WATER HEATING SYSTEM FOR BOILERS
Filed June 2, 1934 5 Sheets-Sheet 5

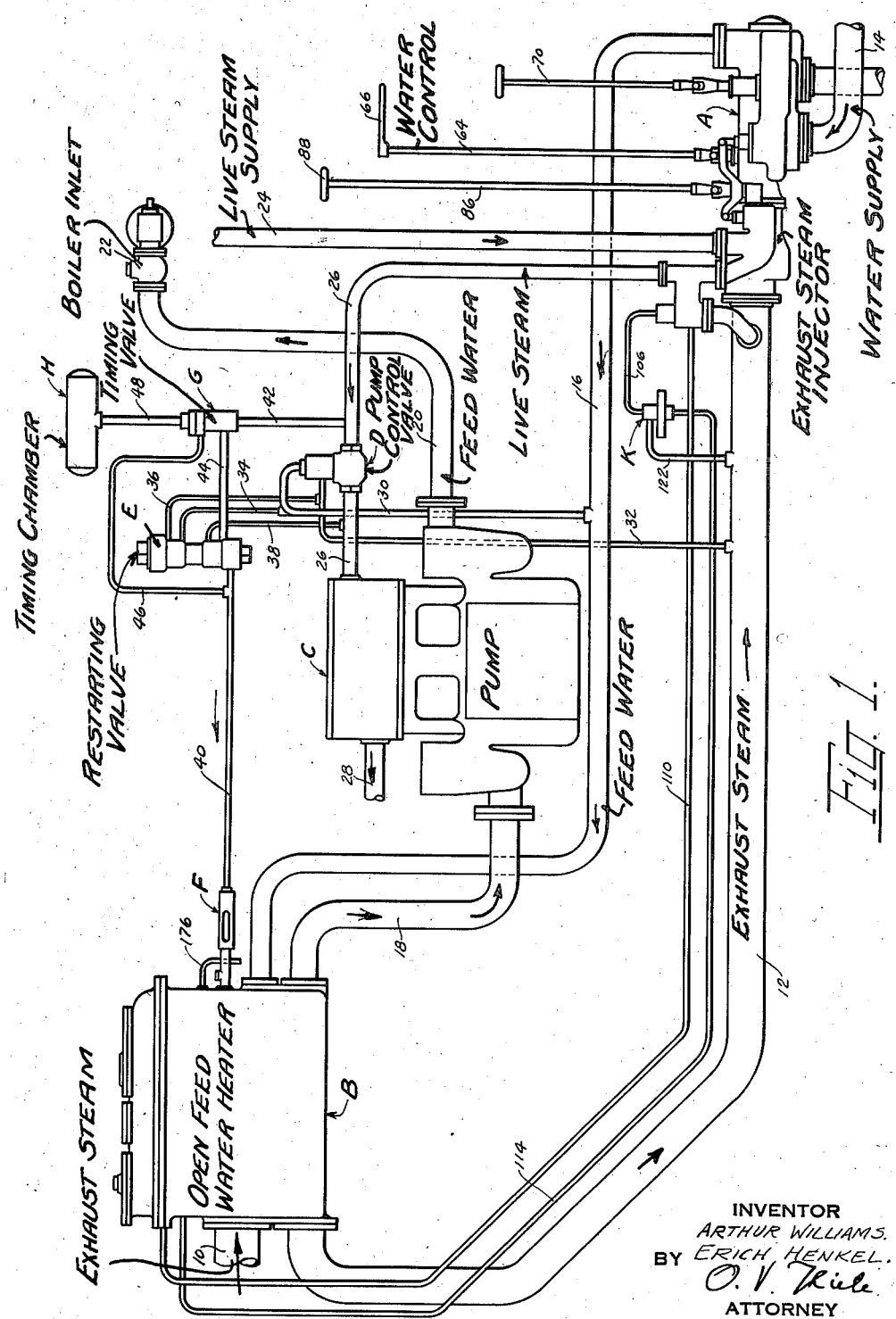

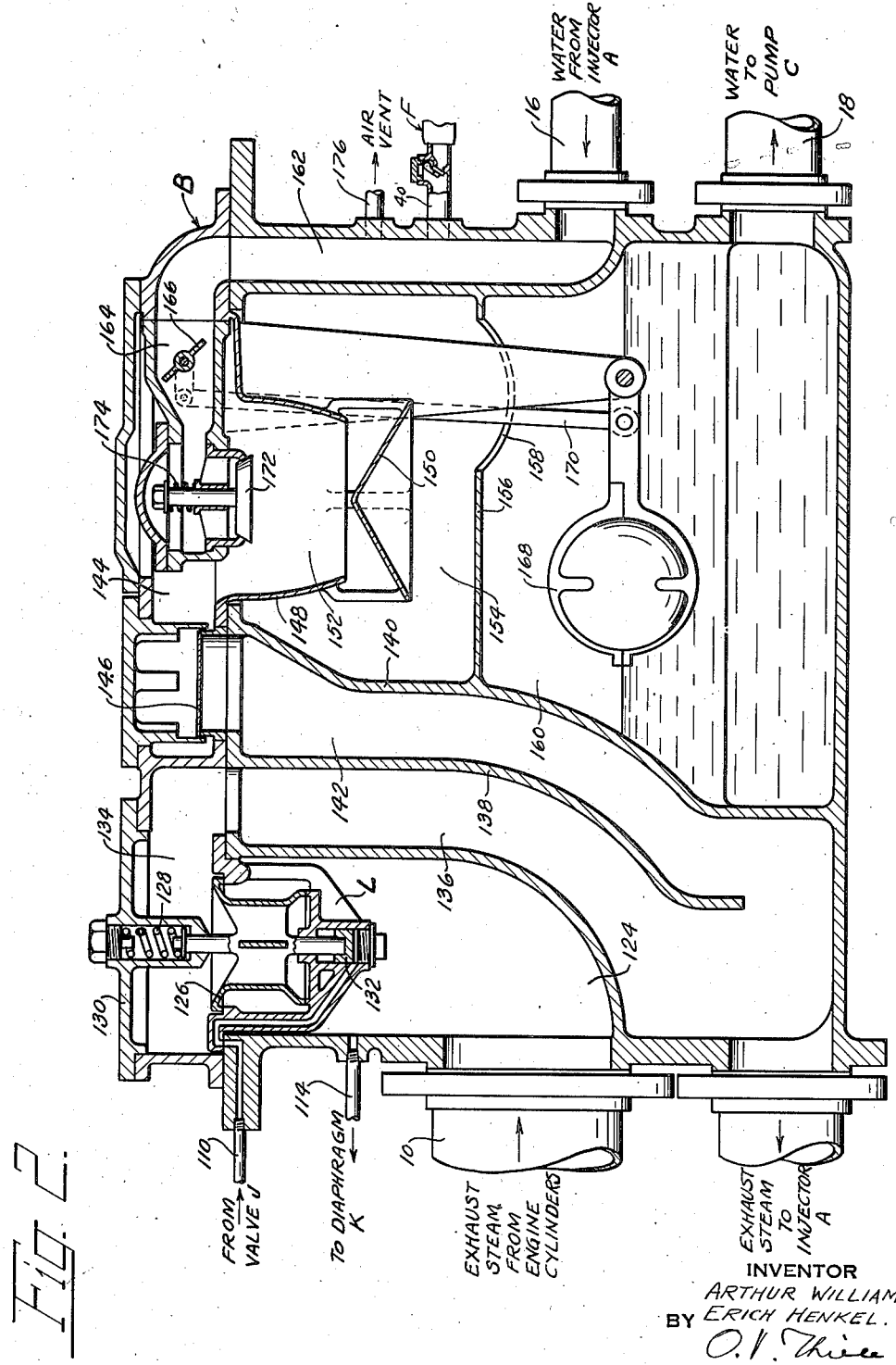

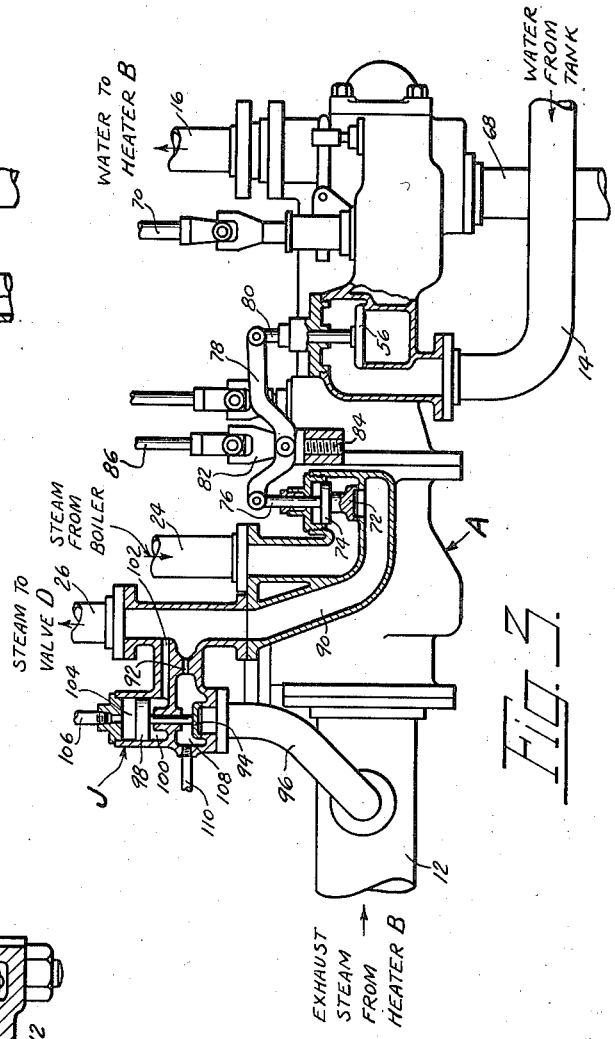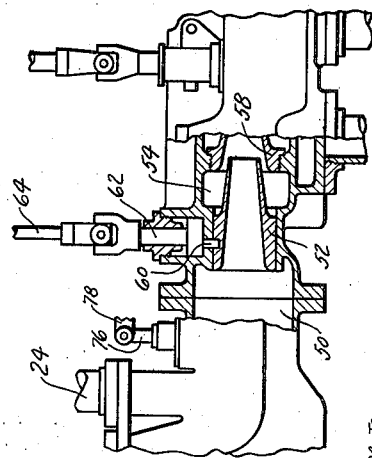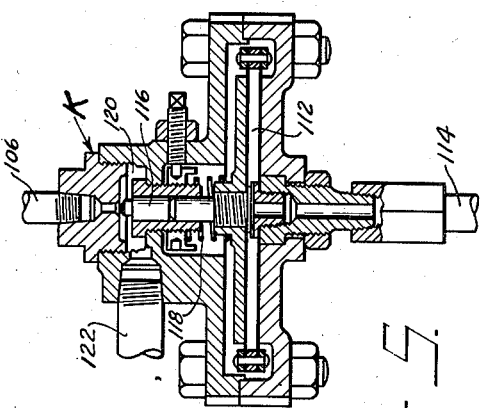

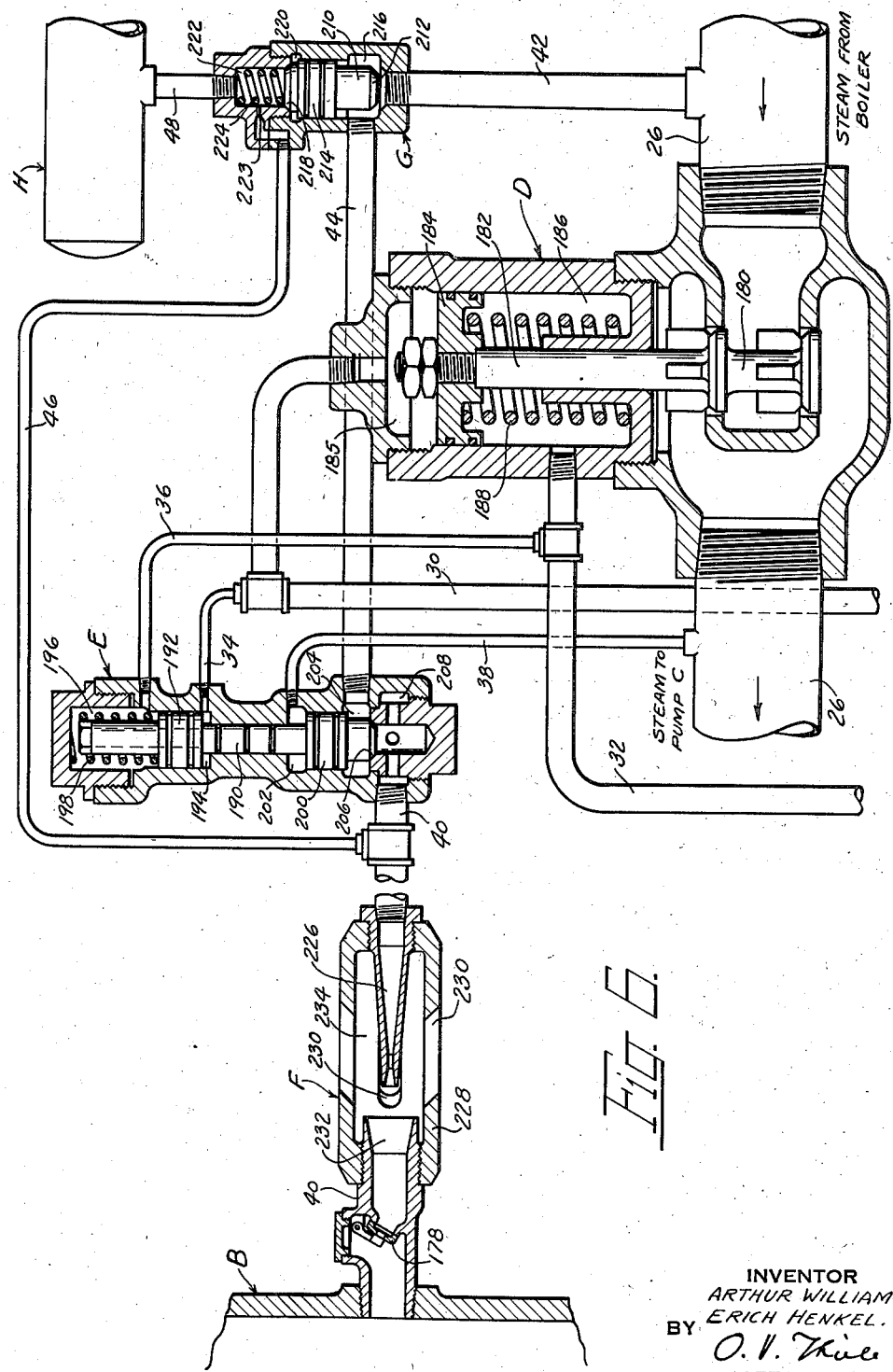

INVENTOR
ARTHUR WILLIAMS.
ERICH HENKEL.
BY
ATTORNEY

Patented Apr. 27, 1937

2,078,785

UNITED STATES PATENT OFFICE 2,078,785

FEED WATER HEATING SYSTEM FOR BOILERS

Arthur Williams, Munster, Ind., and Erich Henkel, Calumet City, Ill., assignors to The Superheater Company, New York, N. Y.

Application June 2, 1934, Serial No. 728,754

24 Claims. (Cl. 261—34)

The present invention relates to feed water heating systems for boilers and has particular reference to feed water heating systems for steam locomotives of the kind in which feed water is heated by direct contact with exhaust steam from the locomotive engine in a heater of the so-called open type.

Still more particularly the invention relates to feed water heating systems of the kind in which the feed water is raised to boiler pressure by two water forcing devices arranged in series with respect to flow of water and between which devices an open feed water heater is located.

Still more particularly the invention relates to feed water heating systems of the above kind in which water is forced to the heater by means of an injector and, after being heated, is forced from the heater to the boiler by means of a mechanical pump.

Amongst the principal objects of the invention are: to provide an improved system in which the amount of water fed to the boiler is controlled by regulation of the amount of feed water fed by a primary or low pressure water forcing device and in which the action of the secondary or high pressure water forcing device is automatically and substantially immediately synchronized with that of the low pressure device, whereby to avoid the difficulties heretofore encountered in systems of this kind which depend upon float controls for effecting regulation of the speed of operation of one or the other of two serially connected water forcing devices; to provide an improved system including an open heater in which reverse flow of water from the heater to the engine cylinders through the exhaust steam supply pipe is positively prevented; and to provide a system in which racing of the secondary or high pressure water forcing device due to loss of suction is automatically and substantially immediately stopped and in which the suction of the secondary or high pressure water forcing device is automatically restored, and this device is automatically restarted in the event its normal operation is interrupted by loss of suction.

Other and more detailed objects of the invention, together with the manner in which the several objects may be attained will best be understood from a consideration of the ensuing description of suitable forms of apparatus for carrying the invention into effect, illustrated herein by way of example in the accompanying drawings forming a part of this specification.

In the drawings:

Fig. 1 is a more or less diagrammatic elevation of a feed water heating system embodying the invention;

Fig. 2 is a vertical section on an enlarged scale of the heater shown in Fig. 1;

Fig. 3 is an elevation partly in section and on an enlarged scale of the injector shown in Fig. 1;

Fig. 4 is an elevation partly in section of a part of the injector shown in Fig. 3;

Fig. 5 is a section on an enlarged scale of a valve shown in Fig. 1;

Fig. 6 is a more or less diagrammatic elevation partly in section and on an enlarged scale of part of the control apparatus shown in Fig. 1.

Figure 7:
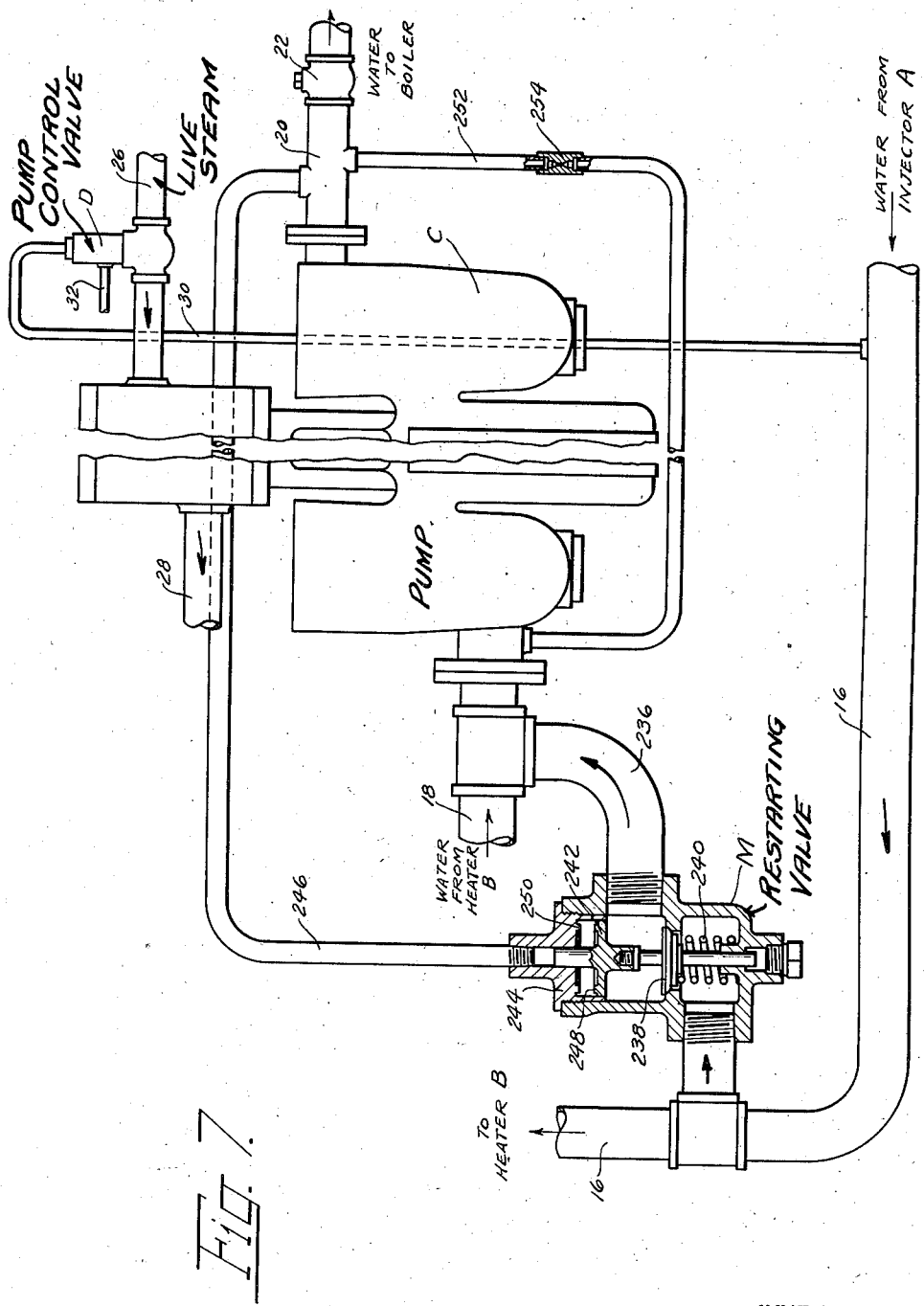
Fig. 7 is a more or less diagrammatic elevation partly in section of a modified form of apparatus adapted to operate with the heater and water forcing devices shown in Fig. 1.

Referring now to Fig. 1, the reference character A designates an exhaust steam injector of the so-called Metcalfe type; B designates an open type feed water heater, and C designates a boiler feed pump, which in the embodiment illustrated is of the usual reciprocating type used with locomotive boilers.

Exhaust steam is conducted from the exhaust steam passages of the locomotive cylinders to the heater B through conduit 10, and conduit 12 connects the steam space in the heater with the injector A for supplying exhaust steam to the injector for the operation thereof. Water is supplied from the engine tender to the injector through the conduit 14 and is delivered under pressure by the injector to the heater through the delivery conduit 16. Conduit 18 connects the water space of the heater with the suction side of pump C, and the delivery side of the pump is connected to the locomotive boiler by the delivery conduit 20, in which is located the usual boiler check valve 22. Live steam for operating the injector when exhaust steam is not available and for operating certain control elements is supplied through conduit 24 leading from the boiler turret (not shown). Conduit 26, in controlled communication with conduit 24, supplies live operating steam to the pump C, which exhausts through conduit 28. Conduit 28 may be connected to the heater B or to the exhaust steam conduit 10, or may discharge to atmosphere.

The pump control valve D for automatic regulation of the speed of operation of the pump is located in conduit 26, and the operating mechanism of this valve is placed in communication with the injector delivery conduit 16 by pipe 30, and is also placed in communication with the exhaust steam supply conduit 12 by pipe 32.

An automatic re-starting valve E is also placed in communication with conduits 16 and 32 by pipes 34 and 36 respectively, and is also connected to the live steam supply conduit 26 on the discharge side of the pump control valve D by pipe 38. The valve E is connected by means of pipe 40 with the interior of the heater B, and a small air injector F is interposed in this pipe. A timing valve G is connected to the live steam supply conduit 26 by pipe 42 and to valve E by pipe 44. It is also connected to pipe 40 by pipe 46, and is further connected by pipe 48 to a closed vessel H providing a timing chamber.

Referring now more particularly to Figs. 3 to 5, the injector, as previously stated, is of the known Metcalfe type, and since the details of the injector design are not important to the present invention, only so much of the structure has been shown as relates to the control.

As seen in Fig. 4, the injector body provides the usual low pressure steam space 50, which is in communication with the main steam nozzle 52. A water chamber 54 is in communication with the supply pipe 14 under the control of water valve 56 and from chamber 54 water flows to the usual water nozzle 58. The usual injector combining and delivery tubes are not illustrated.

In the embodiment illustrated the nozzle 52 is slidably mounted in the injector body, and control of the amount of water supplied to the injector is effected by sliding the nozzle 52 with respect to the fixed nozzle 58 to vary the area of the water passage. Movement of nozzle 52 is effected by means of the eccentric pin 60 mounted on the rotor pin 62 which in turn is connected by any suitable means, such as the control rod 64, to an operating handle 66 or the like located in the engine cab or other place of control. In order to permit the injector to be started it is provided with the usual overflow 68, and in the embodiment illustrated the usual overflow valve is provided with a manual control indicated generally at 70, for positively closing this valve.

The discharge end of the live steam conduit 24 is controlled by a starting valve 72 having a balancing piston 74, and the stem 76 of this valve is pivotally connected to one end of the link 78, the other end of which is pivotally connected to the stem 80 of the water valve 56. The shouldered pin 82 passes through an opening in link 78. The lower end of the pin is threaded at 84 in a suitable boss on the injector body, so that turning movement of the pin serves to raise or lower the link 78. Pin 82 is connected by means of an operating rod 86 to an operating hand-wheel 88 or the like.

A passage 90, which in the embodiment illustrated is cored in the injector body, connects the starting valve with the pump steam supply conduit 26, and from this passage a branch passage having interposed therein a choke 92 leads to the change-over valve indicated generally at J. The change-over valve comprises a valve head 94 seating to close the inlet of a conduit 96 communicating with the exhaust steam conduit 12. A piston 98 is connected to the valve head 94 and the chamber 100 below the piston is in open communication with the steam passage 90 by way of passage 102. Chamber 104 above the piston is connected by means of pipe 106 to the diaphragm valve indicated generally at K. Chamber 108 of the change-over valve, which is in communication with the choke 92, is connected by means of pipe 110 to the exhaust steam valve L, which in the present embodiment is located in the heater B (see Fig. 2). The diaphragm valve K (Fig. 5) comprises a hollow diaphragm 112, the interior of which is placed in communication with the exhaust steam supply from the engine by means of the pipe 114 which, in the present instance, is shown as being connected to the exhaust steam conduit space on the inlet side of the exhaust valve L (see Figs. 1 and 2). A needle valve 116 is slidably mounted in the diaphragm valve so as to be seated to close the outlet of the pipe 106 leading from the change-over J when the diaphragm valve is expanded by the pressure of exhaust steam. A spring 118 acts to collapse the diaphragm when the exhaust steam pressure fails.

The chamber 120, with which pipe 106 communicates when valve 116 is open, is vented by means of pipe 122 to any suitable low pressure zone, and in the embodiment illustrated this pipe is shown as being connected to the exhaust steam conduit 12 (see Fig. 1).

Referring now to Fig. 2, the heater B comprises a cast body providing an upwardly extending steam passage 124 leading from the outlet of the steam supply conduit 10 to the exhaust steam valve L. The valve L comprises a double seated balanced valve member 126 seated by a spring 128 mounted in a suitable recess in the cover plate 130, and is adapted to be opened by the pressure of steam from the pipe 110 acting on the lower side of piston 132 connected to the valve member.

The valve L controls communication between the passage 124 and the chamber 134 in the upper portion of the heater B. A passage 136 formed by the wall of passage 124 and a downwardly extending web 138 leads to the lower portion of the heater body, and at the bottom of the heater communicates with the inlet of conduit 12 for supplying exhaust steam to the injector. A second transverse web 140 extending to the bottom of the heater and spaced from the web 138 provides a passage 142 leading upwardly to a chamber 144 in the top of the heater. A plate check valve 146 is interposed between passage 142 and chamber 144.

A generally conical web 148, carrying at its lower end a conical baffle 150, provides a space 152 connecting chamber 144 and an intermediate and larger chamber 154. The bottom chamber 154 is formed by a horizontal web 156 having a relatively large opening 158 therein providing communication between chamber 154 and the bottom of chamber 160. The inlet end of the conduit 18 leading to the pump is in communication with the lower part of chamber 160.

A passage 162 at the side of chamber 154 provides communication between the discharge end of the injector delivery conduit 16 and a passage 164 in the top of the heater, in which passage is located the pivoted butterfly valve 166. The position of valve 166 is controlled by a float 168 pivotally mounted in chamber 160 and connected to an arm on valve 166 by means of a link 170. A conical spray valve 172 is located in the upper portion of space 152 and controls the outlet of the passage 164. Valve 172 is seated by means of a spring 174. The chamber 154 is provided with a small air vent 176 and is also in communication with the pipe 40 leading from the air injector F. A check valve 178 opening toward the heater is interposed in pipe 40 between the heater and the air injector.

Turning now to Fig. 6, the pump control valve D comprises a valve head 180 connected by stem 182 to piston 184 mounted in the cylindrical upper portion of the valve body. The chamber 185 above the piston 184 is in communication with the pipe 30 connected to the injector delivery conduit 16, and the chamber 186 below the piston is connected by means of pipe 32 to the exhaust steam supply conduit 12. A spring 188 in chamber 186 tends to move the control valve to closed position. As will be noted from the drawings, the valve head 180 does not seat to completely stop flow of steam through conduit 26 when the valve head is in fully closed position.

The automatic re-starting valve E comprises a valve member 190 slidably mounted in the valve body and having at its upper end a piston 192, beneath which the valve body forms a chamber 194, which is in communication with the injector delivery conduit 16 by way of pipes 30 and 34. Above the piston 192 a chamber 196 is provided which is in communication by way of pipes 36 and 32 with the exhaust steam supply conduit 12. A spring 198 located in chamber 196 bears on piston 192 and tends to move the valve member 190 toward its lower position. Intermediate its ends the valve member 190 is provided with a second piston 200, above which is located a chamber 202 in communication by way of pipe 38 with the pump steam supply conduit 26 on the outlet side of the pump control valve D. Below piston 200 a chamber 204 is provided, which is in communication with pipe 44 leading from the timing valve G. The lower end of the valve member 190 terminates in a valve head 206 engaging a suitable seat in the valve body and controlling communication between chamber 204 and chamber 208 in the lower end of the valve body. The inlet end of the pipe 40, leading to the air injector, is in communication with chamber 208.

The timing valve G comprises a valve member 210 having a valve head 212 at its lower end adapted to engage a seat in the valve body to control communication between pipes 42 and 44. Intermediate its ends the valve member 210 is provided with a piston 214, the lower face of which is in communication with chamber 216 in the lower part of the valve body. At its upper end the valve member 210 is provided with a valve head 218 adapted to engage a suitable seat in the valve body to control communication between a chamber 220 at the upper end of the piston and a chamber 222 which is connected to the closed vessel H by pipe 48. A spring 224 in chamber 222 tends to move the valve member 210 to its lower position with the valve head 212 seated. The chamber 222 is also in communication with the pipe 46 through choke 223.

The air injector F comprises a jet nozzle 226 in communication with pipe 40, and an annular body portion 228 having a number of openings 230 in communication with the atmosphere. Nozzle 226 discharges into the combining nozzle 232, the inlet end of which is spaced from the discharge end of nozzle 226, and which opens into the space 234 provided by the injector body.

Turning now to Fig. 7, a modified form of construction is shown, in which the injector delivery conduit 16 and the water supply conduit 18 for the pump are connected by by-pass pipe 236, in which is located the by-pass control valve M.

Valve M comprises a valve head 238 adapted to open toward the conduit 18 and urged toward open position by a spring 240. Valve head 238 is connected to piston 242, above which is provided the chamber 244, which is placed in communication with the pump discharge conduit 20 by means of pipe 246. The piston 242 has an annular valve face 248 adapted to engage a suitable seat 250 in the upper portion of the valve body when piston 242 is in its upper position. The by-pass pipe 252 connects pump discharge conduit 20 on the inlet side of the boiler check valve 22 with the pump supply conduit 18, and a choke 254 is interposed in this conduit.

In this form of apparatus the pump control valve D is arranged in the same manner as in the arrangement shown in Fig. 1 and is connected by pipes 30 and 32 to conduits 16 and 12 respectively. With this arrangement, however, the automatic re-starting valve E, the air injector F, the timing valve G and the timing chamber H, with their various connections, are all omitted.

Again considering the apparatus shown in Figs. 1–6, the operation is as follows:

Let it be assumed that the locomotive engine is operating so that exhaust steam is available, and it is desirable to start the apparatus. Let it further be assumed that there is a normal amount of water in the heater chamber 160, as indicated in Fig. 2. To start the apparatus, the starting valve 72 and water valve 56 are opened by turning the control hand-wheel 88 and due to the downwardly acting unbalanced pressure on the starting valve head 72, which is not completely balanced by the piston 74, the water valve 56 is opened before steam is admitted to the passage 90. Opening of the water valve 56 floods the injector and places it in condition to start upon the admission of operating steam to the injector. The admission of steam to the passage 90 by opening of the starting valve also causes live steam to be admitted through choke 92 to the change-over valve chamber 108. It has been assumed, however, that exhaust steam is available, and consequently the pressure of this steam in the diaphragm 112 of the diaphragm valve K has closed the needle valve 116 at the outlet of the pipe 106. Live steam from the passage 90 is also simultaneously admitted through passage 102 to the chamber 100 below piston 98. Piston 98 is a loose fit in the change-over valve body, and leakage of steam past this piston causes pressure to be quickly built up in the chamber 104, since the outlet pipe 106, leading therefrom, is closed by the diaphragm valve. With high pressure existing in both chamber 100 and chamber 104 the unbalanced pressure acting on the top of the valve head 94 closes the change-over valve and prevents flow of live steam through pipe 96 to the exhaust steam conduit 12. With valve head 94 closed, high pressure is built up in chamber 108, and this pressure is transmitted through pipe 110 to the piston 132 of the exhaust valve L (Fig. 2), thus opening this valve and permitting exhaust steam to flow through passage 136 and the supply conduit 12 to the low pressure steam chamber 50 and steam nozzle 52 of the injector. The admission of this operating steam causes the injector to start as an exhaust steam injector and to build up delivery pressure in the delivery conduit 16.

If the locomotive engine is standing idle when it is desired to start the injector apparatus, or if the engine throttle is closed after the injector is in operation, the injector then operates as a live steam injector, the apparatus functioning in the following manner. Lack of exhaust steam pressure in the diaphragm 112 of the diaphragm valve causes the needle valve 116 to open to vent pipe 106 and the change-over valve chamber 104. With this chamber vented live steam pressure, acting on the under side of piston 100, opens the change-over valve to admit live steam at reduced pressure to the exhaust steam conduit 12. Pressure of the live steam is reduced by the flow through the choke 92, and this steam at reduced pressure will hereinafter be referred to as auxiliary live steam. The reduction of the pressure of the steam in chamber 108 when valve head 94 is opened places the pipe 110 in communication with a low pressure zone, and the lack of pressure on piston 132 of the exhaust steam valve L permits this valve to be closed by the spring 128 to prevent escape of live steam to the engine exhaust passages through the exhaust steam supply pipe 10. Under these conditions the injector will either start or continue to operate as a live steam injector, and as soon as the exhaust steam becomes available will automatically shift to operation as an exhaust steam injector, so that continuous operation of the injector when desired is assured, regardless of the presence or absence of exhaust steam from the engine.

Again assuming the engine in operation and exhaust steam available, and with the exhaust valve held open, exhaust steam flows through passage 142 of the heater, past check valve 146 and into the space 152, where it is condensd by water delivered from the injector delivery conduit 16 through the spray valve 172. Valve 172 is lifted from its seat by the pressure of the water as delivered from the injector. The mixture of exhaust steam condensate and water from the injector flows from chamber 154 in the heater to the water chamber 160, and is pumped from this chamber to the boiler by pump C. In normal operation the water is preheated by condensation of the steam in the injector A to a temperature of approximately 140° F. to 160° F., although this temperature may vary between rather wide limits, and the subsequent heating of the water in the heater B raises the feed water to a temperature approximating the saturation temperature corresponding to the exhaust steam pressure. Consequently there is danger of the pump losing its suction due to flashing of the hot pump suction water into steam. This difficulty is taken care of by operation of the apparatus, as will be described later.

The amount of water supplied by the injector is controlled by regulation of the position of the steam nozzle 52, and the rate of operation of the pump is automatically synchronized so that the quantity of water delivered by the pump will substantially coincide with the quantity of water delivered by the injector. This synchronization of the rates of operation of these two devices is accomplished as follows: when the injector is not in operation and there is no pressure in the delivery conduit 16, no pressure is exerted on the upper face of piston 184 of the pump control valve D, and consequently this valve is in closed position. As soon as the injector starts, however, the injector delivery pressure is communicated to the upper face of piston 184, and the pump control valve D is opened to a degree substantially proportional to the rate at which water is being delivered to the injector since the delivery pressure of the injector varies with the rate of injector operation.

The total pressure in the injector delivery line is made up of the sum of the pressure drop in the delivery line, the resistance to flow through the butterfly valve 166, the resistance to flow through the spray valve 174, and the back pressure of exhaust steam in the heater. The pressure of the exhaust steam also affects the injector operation in a manner influencing delivery pressure. In order to compensate for variations in exhaust steam pressure, which may vary considerably with variations in rates of engine operation, the pipe 32 connecting the exhaust steam supply conduit 12 and the chamber 186 of the valve D is provided. By means of this connection the fluctuations that might occur due to variations in exhaust steam pressure are balanced out. With this arrangement, and assuming the butterfly valve 166 in the heater B to be in a fixed position, the pump control valve D will open to a position automatically governing the rate of operation of the pump in substantially exact accordance with the rate at which water is delivered to the heater by the injector.

While the pump control valve D will normally very closely synchronize the operation of the pump in accordance with the operation of the injector, there may be some slight variation in the relative rates of operation of the two water forcing devices, and in order to compensate for this the auxiliary control comprising the float 168 is provided. If the rate of operation of the pump is slightly less than the rate of operation of the injector, the level of water in the chamber 160 will rise and the consequent rising of the float 168 will tend to close the butterfly valve 166. This will in turn increase the resistance to flow of water from the injector to the spray valve, and will increase the delivery pressure of the injector. The increase of injector delivery pressure will immediately act to further open the pump control valve D to speed up the pump, and the accelerated operation of the pump will continue until the normal water level is reached in the heater. Conversely, operation of the pump at too rapid a rate for a given rate of injector operation will cause the float 168 to drop and increase the opening past the butterfly valve, thereby decreasing the injector delivery pressure and causing the pump control valve to slow down the rate of operation of the pump. The control of the rate of pump operation by the pump control valve provides the major regulation, the float valve acting largely merely as a vernier to insure exact synchronization.

Certain features of construction of the heater apparatus are of major importance, and will now be described. It is of the utmost importance that flow of water to the engine cylinders from the heater through the exhaust steam supply conduit be positively prevented, since if, through accident or otherwise, water does flow to the engine cylinders from the heater, serious damage, if not complete destruction of the engine may ensue.

In accordance with the present invention, the possibility of water reaching the engine from the heater is positively guarded against in a manner which does not depend upon the proper functioning of any parts of the apparatus. By reference to Fig. 2 it will be observed that in the event the water level rises in the heater due to failure of the pump and also of the control apparatus, overflow of water from the heater to the steam passage 142 is normally prevented by the check valve 146. This check valve may leak, however, as may also the exhaust steam valve L, in the event that this valve is closed (valve L will, however, be open in the event both the engine and the injector are operating). Regardless, however, of the position or effectiveness of valves 146 and L, it is impossible for water overflowing from the heater to reach the engine cylinders because of what may be termed the trap that is provided by the passages 136 and 142, which insure the flow of any water escaping past valve 146 to the inlet of the exhaust steam conduit 12 leading to the injector. If water does escape past valve 146, it is directed immediately to the main steam inlet of the injector, and the flow of water to the steam nozzle of the injector will automatically cause the injector to cease operation, and consequently stop the continued supply of water to the overflowing heater chamber. Thus it is evident that the provision of this trap arrangement provides a positive insurance against damage to the engine from an overflowing heater, which insurance is not dependent upon the proper functioning of any part of the apparatus or a proper seating of any check valves or the like.

As previously mentioned, the possibility of the pump losing its suction and running away is involved by the supplying of preheated suction water to the pump. If pressure of exhaust steam as supplied to the heater remains constant, the water as supplied to the pump will not ordinarily be heated to the vaporizing temperature at the existing pressure, and under such conditions the difficulty due to loss of pump suction is not to be expected. However, where the exhaust steam is supplied from the locomotive engine, its pressure may suddenly drop materially due to change of operating conditions of the engine, and in this event the water in the heater and pump suction line may be at a temperature above the vaporizing temperature at the reduced pressure. Under these conditions, flashing of some of the water into steam and loss of pump suction, with consequent racing of the pump, may occur.

In the form of apparatus illustrated in Figs. 1 to 6, racing of the pump for any appreciable length of time upon loss of suction of the pump is prevented, and the pump suction is automatically restored and normal working of the pump restarted by the apparatus comprising the valve E, the air injector F, the timing valve G, and the timing chamber H.

Referring now more particularly to Fig. 6, and assuming the pump to be functioning properly, the condition of the above enumerated elements is as follows:

Live steam from the pump supply conduit on the inlet side of the pump valve D, acting on the lower face of piston 214 of the timing valve G, lifts the lower head 212 of this valve from its seat, as is shown in the figure, and seats the upper head 218. With the valve head 212 off its seat, high pressure live steam is admitted to chamber 204 of the restarting valve E, and tends to lift the valve head 206 from its seat. Live steam is, however, also admitted from pipe 38 to chamber 202 of valve E and acts to counterbalance the pressure in the chamber 204, so as to maintain valve head 206 seated. It will be noted that the unbalanced area of the upper face of piston 200 is greater than that of the lower face of the piston, in order to compensate for normal pressure drop through the pump control valve D. With the valve head 206 seated, live steam is prevented from reaching the pipe 40 leading to the air injector, and pipe 46, which is connected to pipe 40, is in open communication with the atmosphere through the injector openings 230, thus venting the timing chamber H. Injector delivery pressure acts on the lower face of the upper piston 192 of valve E, and the upper face of this piston and the upper end of the valve member are exposed to the pressure of exhaust steam admitted through pipe 36. The valve member 190 is subjected to injector delivery pressure, with respect to which pressure the influence of variations in exhaust steam pressure is balanced out, in order to obtain consistent operation of the re-starting valve E regardless of fluctuations in boiler pressure, which obviously affect the pressure existing in chamber 204. The combined fluid pressures acting on the valve member 190, together with the pressure of spring 96, keep the valve head 206 seated as long as the pump is in normal operation. If now the exhaust steam pressure should drop to an extent causing flashing of steam in the suction line of the pump with consequent racing of the pump, the steam pressure in the pump supply conduit 26 on the discharge side of the control valve D will immediately drop. The resulting drop in pressure in chamber 202 of the valve E permits the combined pressures acting on the lower faces of pistons 200 and 192 to lift the valve member 190 and permit high pressure steam to flow to the pipe 40 and to the injector F. Injector F immediately forces air under pressure into chamber 154 of the heater B, and re-establishes the pump suction by forcing water to the pump and also by stopping further flashing of the water into steam because of reduced pressure in the heater. This action takes place with great rapidity, and it has been found in actual practice that a reciprocating pump of the kind illustrated will not race for more than two or three strokes before suction is restored and normal working of the pump is re-started.

Due to the restriction provided by the nozzle 226, pressure in pipe 40 leading to the injector nozzle rises to a relatively high value, and steam from this pipe passes through pipe 46, choke 223 and pipe 48 to the timing chamber H until the pressure is built up in the latter chamber to an extent sufficient to close the timing valve G with the aid of the pressure from spring 224. As soon as the timing valve G is closed, pressure falls in the chamber 204 in valve E, and the valve shifts to its lower or closed position, thus stopping operation of the air injector F. If operation of the air injector F ceased before either the exhaust steam pressure in chamber 154 had been raised or the temperature of the water in chamber 160 of the heater and the suction line to the pump had cooled sufficiently so that it would not flash at reduced exhaust steam pressure, the pump would again lose its suction and the cycle of operation would be repeated. This would result in unsatisfactory chattering operation of the apparatus, and it is in order to avoid such chattering operation that the timing valve and timing chamber are provided.

It has been found from experience that a timing chamber and a choke so proportioned that a period of from fifteen to twenty seconds is required after commencement of the operation of the air injector F before the timing valve is closed, permits the establishing of stable conditions on the suction side of the pump. If this amount of time is provided for, the valve 206 can be seated and the air injector operation stopped without danger of causing the pump to immediately lose its suction again.

When the timing valve G is closed and steam is consequently cut off from the pipe 40 leading to the air injector F, the timing chamber H is in communication with the atmosphere by way of the choke 223, pipe 46, pipe 40 and the openings 230 in air injector. Pressure in the timing chamber H is consequently dissipated through this atmospheric vent connection, and loss of pressure in the timing chamber permits live steam pressure in pipe 42 to open the starting valve.

By the time the starting valve is again opened, pressure has been re-established in chamber 202 of the valve E due to the fact that the pump is again in normal operation and normal high pressure again exists in the pump steam supply conduit and in pipe 38. Consequently when high pressure steam is again admitted to chamber 204 of valve E, due to the re-opening of the timing valve, the valve E remains in closed position and will remain in this position until again shifted by loss of pressure in chamber 202 due to racing of the pump. The air vent leading from the chamber 154 of the heater is sufficiently small so as not to prevent the building up of pressure in this chamber by the air injector F, and affords means for flow from the heater of air and other non-condensable gases.

From the foregoing it will be evident that the above described apparatus provides means for the automatic re-starting of the pump in normal operation whenever the pump suction is broken.

In the form of apparatus shown in Fig. 7, the pump, in the event it breaks its suction and commences to race, is immediately re-started by by-passing water from the injector directly to the inlet of the pump. In the apparatus shown in this figure, and with the pump in normal operation, pump delivery pressure transmitted to chamber 244 of the valve M through pipe 246 maintains the valve head 238 in closed position, and all of the water delivered from the injector flows to the heater B through conduit 16 and from the heater B to the pump through conduit 18. In the event the pump loses its suction, the delivery pressure of the pump will fail, and valve 238 will be lifted from its seat by the continued action of the injector delivery pressure and spring 240. Relatively cool feedwater from the injector is thereupon fed directly through the by-pass pipe 236 to the pump, and serves to reduce the temperature of the water drawn by the pump from conduit 18 and the by-pass conduit sufficiently to restore the pump suction. As soon as the pump goes to work again, delivery pressure is restored, valve 238 is closed, and the injector delivery follows its normal course to the heater. The by-pass conduit 252 and the choke 254 are provided to insure against delivery pressure being maintained in the portion of the delivery conduit between the pump and the boiler check valve when the pump loses its suction. It will be evident that in the event the boiler check leaks (a condition that often exists in practice), the pump valves would act to trap water in the portion of the delivery conduit 20 between the pump and the check valve, and the resulting pressure in this portion of the delivery conduit would prevent proper opening of the by-pass valve 238. Preferably, when this arrangement is used, the boiler check valve is placed close to the pump or an additional check valve is placed in the line at this point, so that the volume of the delivery conduit on the inlet side of the check valve is relatively small. With this arrangement, this portion of the delivery conduit can be readily vented by a comparatively small choke orifice, and the consequent continuous by-passing through this choke when the pump is in normal operation may be made so small as to be of no consequence.

The form of apparatus illustrated in Fig. 7 provides a somewhat simpler mechanical arrangement than that shown in Fig. 6, but the form of Fig. 7 has a disadvantage, as compared with the form shown in Fig. 6, of supplying water to the pump which is at substantially lower temperature than the water supplied from the heater. Consequently, whenever the pump loses its suction, water is fed to the boiler by the apparatus shown in Fig. 7 which is at a lower temperature than normal feed water temperature. Obviously, it is more desirable to feed to the boiler at all times water which is at normal feed water temperature, and the choice of the form of pump re-starting apparatus will depend upon the relative advantage in any given installation of mechanical simplicity as compared with a supply of high temperature feed water at all times. In this connection, it is to be noted that with the heater arrangement provided by the present invention hot feed water is delivered by the pump at all times, regardless of whether or not the engine is in operation and supplying exhaust steam for heating purposes.

Referring to Figs. 2 and 3, it will be evident that when the engine is not in operation and the injector is being operated by auxiliary live steam, the supply of this steam through the connection 96 to the conduit 12 permits the auxiliary live steam to flow from the inlet end of conduit 12 through passage 142 and check valve 146 to the heater, as well as to the injector from the outlet end of conduit 12. Under such conditions, escape of auxiliary live steam through the engine exhaust pipes by way of the steam supply conduit 10 is prevented by the exhaust steam valve L.

When the feed water is preheated by auxiliary live steam, there is of course no thermal gain, and from the standpoint of boiler capacity the use of live steam for feed water heating purposes must be considered as a disadvantage. This disadvantage is, however, more than compensated for by the advantage to be derived from the avoidance of feeding relatively cold feed water to the boiler.

Since there are numerous pressure and flow factors that vary in apparatus of this character with variations in rates of operation of the injector and pump, it will be evident to those skilled in the art that factors other than those herein illustrated may be employed for governing the rate of pump operation. We have found, however, that injector delivery pressure provides a very satisfactory control factor for governing the pump control valve, and that pump steam supply and pump delivery pressures provide very satisfactory factors for obtaining proper control of racing of the pump and for pump re-starting purposes.

While, in compliance with the patent statutes, we have described and illustrated forms of apparatus which we consider to be the most satisfactory, it is to be understood that the invention is not in any way limited to the specific forms of construction herein disclosed by way of example, but is to be considered as embracing all forms of apparatus falling within the scope of the appended claims when they are construed as broadly as is consistent with the state of the prior art; and it is further to be understood that without departing from the spirit or scope of the invention certain features of the invention may be used to the exclusion of others.

What is claimed is:

1. In apparatus of the character described, in combination, an open feed water heater, an exhaust steam injector for supplying water to the heater, a pump for forcing water from the heater to a boiler, a conduit for conducting exhaust steam from an engine to said heater and a conduit for conducting exhaust steam to said injector, said last mentioned conduit being arranged to receive water overflowing from said heater and to conduct the same by gravity to said injector.

2. In apparatus of the character described, in combination, an open feed water heater, an exhaust steam injector for supplying water to said heater, a pump for forcing water from the heater to a boiler, means forming a conduit having a trap therein for conducting exhaust steam from an engine to the heater and a conduit connecting a low point in said trap with the injector whereby to conduct water overflowing from said heater to the injector and to prevent flow of water from the heater to the engine through the first mentioned conduit.

3. In apparatus of the character described, in combination, an open feed water heater comprising a casing providing a chamber for condensing exhaust steam, an exhaust steam injector for supplying water to said chamber, walls forming steam supply passages in said casing adjacent to said chamber, said passages providing a trap and a conduit connecting said trap with said injector for conducting steam to the injector and for conducting to the injector water overflowing from said heater.

4. In apparatus of the character described, in combination, an open feed water heater, means for supplying water to said heater, means for supplying exhaust steam from an engine to said heater, a pump for forcing hot water from the heater to a boiler and means automatically responsive to racing of said pump and lowering the temperature of the water supplied to the pump to re-establish normal operation thereof.

5. In apparatus of the character described, in combination, an open feed water heater, means for supplying water to said heater, means for supplying exhaust steam from an engine to said heater, a pump for forcing hot water from the heater to a boiler and means automatically responsive to racing of the pump to increase the pressure of the water in said heater.

6. In apparatus of the character described, in combination, an open feed water heater having a chamber for condensing steam, means for supplying water to said chamber, means for supplying exhaust steam from an engine to said chamber, a pump for forcing water to a boiler, a conduit connecting said chamber with the suction side of said pump and means automatically responsive to racing of said pump for increasing the pressure in said chamber whereby to increase the pressure of the water supplied to said pump to re-establish working of the pump.

7. In apparatus of the character described, in combination, an open feed water heater having a chamber for condensing steam, a conduit for supplying water to said chamber, a conduit for conducting exhaust steam to said chamber, the last mentioned conduit having a check valve therein, a pump for forcing water to a boiler, a conduit connecting said chamber with the suction side of said pump and means automatically responsive to racing of the pump for injecting air into said chamber to increase the pressure therein, whereby to reestablish working of the pump.

8. In apparatus of the character described, in combination, an open feed water heater having a chamber for condensing steam, a conduit for supplying water to said chamber, a conduit for supplying exhaust steam to said chamber, a check valve in the last mentioned conduit, a pump for forcing water to a boiler, a conduit connecting said chamber with the suction side of said pump, a steam operated injector for forcing air into said chamber to raise the pressure therein and means for automatically supplying steam to said injector upon racing of said pump.

9. In apparatus of the character described, in combination, an open feed water heater, water forcing means, a conduit for conducting water from said water forcing means to the heater, a pump for forcing water to a boiler, a conduit connecting the heater with the suction side of said pump, a by-pass conduit connecting the said conduits and means automatically responsive to racing of the pump for opening said by-pass conduit.

10. In apparatus of the character described, in combination, an open feed water heater, water forcing means, a conduit for conducting water from said water forcing means to the heater, a pump for forcing water to a boiler, a conduit connecting the heater with the suction side of said pump, a by-pass conduit connecting said conduits, a valve in said by-pass conduit and means actuated by the delivery pressure of the pump for maintaining said valve closed when the pump is operating normally and for permitting water to flow directly from the first mentioned conduit to the second mentioned conduit through said by-pass conduit when the pump races.

11. In apparatus of the character described, in combination, an open feed water heater, water forcing means, a conduit connecting the water forcing means with the heater, a pump, a conduit connecting the heater with the suction side of the pump, a delivery conduit for conducting water from the pump, a check valve in the delivery conduit, a restricted orifice for placing the portion of the delivery conduit between the pump and said check valve in communication with a zone of lower pressure, a by-pass conduit connecting the two first mentioned conduits, a valve in the by-pass conduit, pressure responsive means for closing said valve and a conduit placing said pressure responsive means in communication with said delivery conduit at a place between the pump and said check valve.

12. In apparatus of the character described, in combination, an open feed water heater, an exhaust steam injector, a conduit for conducting water from said injector to the heater, a pump for forcing water to a boiler, a conduit connecting the heater with the suction side of the pump, a by-pass conduit connecting said conduits, a valve normally closing said by-pass conduit and means for automatically causing said valve to open in response to racing of the pump.

13. In apparatus of the character described, in combination, an open feed water heater, an exhaust steam injector for supplying water to said heater, means for supplying exhaust steam from an engine to said heater, a pump for forcing heated water from said heater to a boiler, manually operable means for controlling the amount of water delivered to the injector, means for synchronizing the momentary rate of operation of the pump in accordance with the momentary rate of operation of the injector, and means for automatically supplying relatively cool water to the pump directly from the injector upon racing of the pump.

14. In a feed water heating system having an open feed water heater and a hot water pump for forcing water from the heater to a boiler, means for preventing continued racing of the pump upon loss of suction comprising a restarting valve automatically shiftable in response to change of condition produced by racing of the pump from a normal operating position to a second position effecting an increase in the pressure on the hot water supplied to the pump, whereby to restore the supply of suction water to the pump, and timing means for automatically restoring the restarting valve to said normal operating position after a predetermined interval.

15. In a feed water heater system having an open feed water heater and exhaust steam operated means for forcing water to the heater, conduit means for supplying exhaust steam from an engine to said heater and to said water forcing means, said conduit means being arranged to provide an open and unobstructed path for gravity flow to said water forcing means of water overflowing from said heater.

16. In a feed water heating system, an open feed water heater, an exhaust steam injector of the type adapted to be operated by live steam when exhaust steam is not available for supplying water to said heater, conduit means for conducting exhaust steam from an engine to said heater and to said injector, an exhaust steam valve in said conduit means, said heater and said injector being in communication with the portion of said conduit means on the outlet side of said valve, an auxiliary live steam supply conduit in communication with said exhaust steam conduit means on the outlet side of said valve, a changeover valve for controlling said auxiliary live steam conduit, and means for automatically opening one of said valves while closing the other, and vice versa, whereby to provide a continuous supply of steam to both said heater and said injector.

17. In apparatus of the character described, an open feed water heater, means for supplying water to said heater, means for supplying exhaust steam from an engine to said heater, a pump for forcing hot water from the heater to a boiler, and means operable in response to a pressure change produced by racing of said pump for increasing the pressure of the water fed to the pump, whereby to reestablish normal operation of the pump.

18. A feed water heating system for boilers comprising an open feed water heater, a water forcing device for supplying water to the heater, a pump for forcing water from the heater to a boiler, manually controllable means for controlling the rate at which said system delivers heated feed water to the boiler comprising means for controlling the rate at which water is supplied to the heater by said device, and means operable in response to a regulating impulse variable with variations in the value of the momentary rate of flow from said device to substantially synchronize the rate of operation of said pump in accordance with the rate of operation of said device.

19. A feed water heating system for boilers comprising an open feed water heater, a water forcing device for supplying water to the heater, a pump for forcing water from the heater to a boiler, manually controllable means for controlling the rate at which said system delivers heated feed water to the boiler comprising means for controlling the rate at which water is supplied to the heater by said device, means operable in response to a regulating impulse variable with variations in the value of the momentary rate of flow from said device to substantially synchronize the rate of operation of said pump with the rate of operation of said device, and means responsive to change of level of water in the heater to modify the value of said impulse whereby to insure a substantially constant water level in the heater.

20. A feed water heating system for boilers comprising an open feed water heater, an injector for supplying water to the heater, a pump for forcing water from the heater to a boiler, manually controllable means for controlling the rate at which said system supplies heated feed water to the boiler comprising means for controlling the rate at which water is supplied to said injector, and means operable in response to a regulating impulse variable with variations in the value of the momentary rate of flow from the injector to substantially synchronize the rate of operation of the pump in accordance with the rate of operation of the injector.

21. A feed water heating system for boilers comprising an open feed water heater, an injector for supplying water to the heater, a pump for forcing water from the heater to a boiler, manually controllable means for controlling the rate at which said system supplies heated feed water to the boiler comprising means for controlling the rate at which water is supplied to the injector, means operable in response to a regulating impulse variable with variations in the value of the momentary rate of flow from the injector to substantially synchronize the rate of operation of the pump in accordance with the rate of operation of the injector, and means responsive to change of level of water in the heater to modify the value of said impulse whereby to insure a substantially constant water level in the heater.

22. A feed water heating system for boilers comprising an open feed water heater, an injector for supplying water to the heater, a pump for forcing water from the heater to a boiler, manually controllable means for controlling the rate at which said system supplies heated feed water to the boiler comprising means for controlling the rate at which water is supplied to the injector, and means operable in response to variations in the delivery pressure of the injector to substantially synchronize the rate of operation of the pump in accordance with the rate of operation of the injector.

23. A feed water heating system for boilers comprising an open feed water heater, an injector, a conduit for conducting water from the injector to the heater, a pump for forcing water from the heater to the boiler, manually controllable means for controlling the rate at which said system delivers heated feed water to the boiler comprising means for controlling the rate at which water is supplied to the injector, valve means providing a variable restriction in said conduit, float control means for closing said valve means upon rise of water level in said heater and a pressure responsive valve operable in response to variations in pressure in said conduit between the injector and said valve means for governing the rate of operation of said pump.

24. A feed water heating system for boilers comprising an open feed water heater, an exhaust steam injector for supplying water to the heater, a pump for forcing water from the heater to a boiler, means for supplying exhaust steam from an engine to said heater and to said injector, manually controllable means for controlling the rate at which water is supplied by said system to the boiler comprising means for controlling the rate at which water is supplied to the injector, a valve for controlling the rate of operation of said pump, and means for governing the position of said valve in accordance with variations in the difference in pressure between the delivery pressure of the injector and the pressure of the exhaust steam supplied to the heater.

ARTHUR WILLIAMS.
ERICH HENKEL.